United States Patent
Thomas et al.

(10) Patent No.: US 6,788,664 B1
(45) Date of Patent: Sep. 7, 2004

(54) COMMUNICATION SYSTEM FOR CIRCUIT SWITCHED AND PACKET SWITCHED TRAFFIC

(75) Inventors: Mark K Thomas, Newton Abbot (GB); Peter Beighton, Honiton (GB); Philip N Johnson, Paignton (GB)

(73) Assignee: Nortel Networks Limited, St. Laurent (CA)

( * ) Notice: Subject to any disclaimer, the term of this patent is extended or adjusted under 35 U.S.C. 154(b) by 696 days.

(21) Appl. No.: 09/710,375

(22) Filed: Nov. 9, 2000

(51) Int. Cl.[7] .................................................. H04J 3/00
(52) U.S. Cl. ...................... 370/336; 370/352; 370/442; 370/468
(58) Field of Search ................................ 370/352, 353, 370/354, 355, 356, 357, 360, 468

(56) References Cited

U.S. PATENT DOCUMENTS

| | | | | |
|---|---|---|---|---|
| 5,697,059 A | * | 12/1997 | Carney | 455/509 |
| 5,790,534 A | * | 8/1998 | Kokko et al. | 370/335 |
| 6,005,852 A | * | 12/1999 | Kokko et al. | 370/329 |
| 6,016,311 A | * | 1/2000 | Gilbert et al. | 370/280 |
| 6,266,330 B1 | * | 7/2001 | Jokinen et al. | 370/329 |
| 6,434,380 B1 | * | 8/2002 | Andersson et al. | 455/406 |
| 6,483,820 B1 | * | 11/2002 | Davidson et al. | 370/329 |
| 6,608,832 B2 | * | 8/2003 | Forslow | 370/353 |
| 2001/0005378 A1 | * | 6/2001 | Lee | 370/459 |

FOREIGN PATENT DOCUMENTS

| | | | |
|---|---|---|---|
| EP | 0236102 | 9/1987 | ............ H04J/3/16 |
| EP | 0752667 | 1/1997 | ........... G06F/13/40 |
| GB | 2301992 | 12/1996 | ........... H04L/12/64 |
| WO | WO95/31060 | 11/1995 | ........... H04L/12/66 |
| WO | WO98/27698 | 6/1998 | ........... H04L/12/64 |

\* cited by examiner

Primary Examiner—Seema S. Rao
Assistant Examiner—Michael J. Moore, Jr.
(74) Attorney, Agent, or Firm—Barnes & Thornburg

(57) ABSTRACT

A communication system, in particular a fixed wireless access communication system, including a transmission link, such as a broadcast downlink or a multiple access uplink, having a number of channels and apparatus for transmitting circuit switched and packet switched traffic over said transmission link. The system additionally includes a controller device for periodically pre-allocating channels to circuit switched traffic for a set time period dependent on one or more system parameters existing in a previous set time period. The system parameter may be the number of circuit switched connections operating in a previous set time period. The controller device may comprise a monitoring unit for determining a first number equal to the number of operating circuit switched connections in a previous set time period, a summing unit for forming a sum of the first number and an estimated margin and apparatus for allocating the summed number of channels to circuit switched connections for the next set time period.

24 Claims, 5 Drawing Sheets

COMMUNICATION SYSTEM FOR CIRCUIT SWITCHED AND PACKET SWITCHED TRAFFIC

FIELD OF THE INVENTION

The present invention relates to a communication system suitable for transmitting circuit switched and packet switched information over a common transmission link. In particular it relates to a system for transmitting circuit switched and packet switched information over a common time division multiplexed or time division multiple access transmission link in a fixed wireless access communication system or to a system in which packet switched information is transmitted across a channelised transmission link.

It is often desirable to transmit both circuit switched information and packet switched information from a first to a second location.

A circuit switched connection is characterised by the presence of a set-up phase, a connection phase during which a fixed amount of transmission capacity is assigned, and a tear down phase. Routing is determined during the set up phase and is constant throughout the connection. The advantage of circuit switching is that once a connection is established, the transmission capacity required for that connection is guaranteed. Thus, latency is both minimised and constant. The disadvantage is that the capacity is taken up by the connection even when no data is being sent. The predominant application for circuit switched connections is voice transmission (eg. telephony). Voice-band dial-up modems depend on circuit switched connections through the PSTN, and these provide a good example of the wasteful aspect of circuit-switching as the telephone call is maintained even when the data equipment has nothing to send.

A packet-switched data transfer is characterised by the division of the data payload to be transmitted into frames or packets, each of which carries a source and destination address. The packets are routed individually and so several data transfers can share a common transmission link using statistical multiplexing. Packet-switched networks can make use of buffering and flow control techniques (eg. Transmission Control Protocol) and can therefore adapt to changes in loading by increasing or decreasing the rate at which packets are transmitted from each source. A packet-switched approach will generally be more efficient than a circuit-switched approach in an application, such as Internet access, where the data sent is sufficiently bursty or intermittent, and where some variation in latency can be tolerated.

Separate transceiver facilities could be used between a first and a second location, one transceiver facility associated with a circuit switched transmission link and one transceiver facility associated with a packet switched transmission, as is described in International Patent Application WO 95/31060. However, this is a high cost option in view of the cost of duplicated transceiver facilities.

It is known to use a single transmission link, such as a time division multiplexed transmission link for transmitting both circuit switched information and packet switched information from a first to a second location. A problem exists with regard to the currently available arrangements for assigning time slots and/or channels on the transmission link to the two types of traffic.

One option is a fixed assignment wherein each type of traffic is permanently assigned to certain channels or circuits. This is undesirable as no provision is made for the different levels of traffic that exist at different times. For example, using a fixed assignment there could be unused or idle channels assigned to the circuit-switched information during times when all the channels assigned to the packet information are busy and there is a backlog of packet information waiting to be transmitted. Also, there could be times where new circuit-switched connections are blocked because all of the channels allocated to circuit switched traffic are in use during times when there is an under utilisation of the channels allocated to packet information.

This problem has been solved by the use of dynamic assignment mechanisms so that time slots in a transmission link are used efficiently. Such a system is described in EP 0236 102. In this system which operates in real time, preference in the use of time slots is normally given to circuit switched information, although packet switched information is assigned a minimum number of time slots so that there is never a total blockage of packet information in times of heavy circuit switched traffic. Dynamically operated control facilities are provided to allocate packet switched information to all time slots not currently allocated to a circuit switched connection and to all idle time slots currently allocated to a circuit switched connection.

The problem with the system proposed in EP 236 102 arises from the actions that are necessary whenever a new circuit-switched connection is required. The terminal control facilities must suspend packet data transfers, revise the channel allocations, and communicate the new channel assignments to a remote terminal, all before setting up the new circuit-switched connection (and restarting packet transfers). This may be acceptable in the point-to-point transmission links referred to in EP 236 102. However, in point-to-multi-point transmission links, it would be necessary to communicate the revised channel assignments to each of the remote terminals, possibly by means of unreliable transmission paths. The resulting delay in establishing a circuit connection would be significant in many applications. In the case of a TDMA fixed wireless access system, the technique described in EP 236 102 would result in an unacceptable delay before establishing a voice-band path between the telephone set and the local exchange. Alternatively, a means could be devised to set up the new circuit-switched connection without co-ordinating the packet assignments, but this would result in lost packets at a rate that would be unacceptable in most applications.

The same problem arises for the system decribed in GB2,301,992 in which channels in a TDMA transmission link are allocated dynamically to circuit switched information and the remaining time slots in the link are allocated dynamically to packet switched information. In this system packet switched information is preferentially allocated to idle time slots in a previously under utilised control channel in order to improve the efficiency with which both types of information are transmitted.

OBJECT OF THE INVENTION

The object of the present invention is to provide a communication system suitable for transmitting circuit switched and packet switched information over a common transmission link in which the capacity of the link is improved without extending the set up time for circuit-switched connections.

SUMMARY OF THE INVENTION

According to a first aspect of the present invention there is provided a communication system including:

a transmission link having a number of channels; and means for transmitting circuit switched and packet switched information over said transmission link;

wherein the system additionally includes a controller device for periodically pre-allocating channels to circuit switched traffic for a set time period dependent on one or more system parameters existing in a previous set time period.

Thus, at all times there are automatically pre-allocated channels for circuit switched traffic and the remainder of the link resource is available for use by packet switched traffic. This simplifies the process of allocating incoming traffic to channels and/or timeslots on the link as compared to the known methods for real time dynamic allocation of link resource. Additionally, this pre-allocation of channels is automatically optimised on a periodic basis in order to make good use of the link resource, as compared to static allocation, while maintaining the required grade of service to circuit traffic. Furthermore, if the peaks for circuit and packet switched traffic are offset in time then the capacity of the link will be increased by the use of the present invention. A further advantage is that the automatic allocation of channels by the controller device reduces the need for operator intervention and decreases the probability of the allocation of channels between circuit and packet switched traffic being incorrectly set.

Preferably, one of the system parameters is the number of circuit switched connections operating in a previous set time period. In this way the number of channels allocated to circuit switched connections can be made to follow the actual level of use of circuit switched connections by users of the system.

In a preferred embodiment the controller device comprises:
- a monitoring unit for determining a first number equal to the number of operating circuit switched connections in a previous set time period;
- a summing unit for forming a sum of the first number and an estimated margin;
- means for allocating the summed number of channels to circuit switched connections for the next set time period; and
- means for repeating the above steps after the next time period elapses.

By providing a margin of channels not currently used for operating circuit switched connections for anticipated future use by new circuit switched connections in the next time period, call blocking of circuit switched connections can be minimised while freeing up channels to packet switched traffic when circuit switched usage levels of the system are low. This will achieve the desired grade of service for circuit-switched traffic while optimising the grade of service for packet-switched traffic.

In a preferred embodiment a maximum number of the channels of the transmission link is set for circuit switched connections so that there are always some channels available on the transmission link for packet switched traffic. In this preferred embodiment the controller device may comprise:
- a monitoring unit for determining a first number equal to the number of operating circuit switched connections in a previous set time period;
- a summing unit for forming a sum of the first number and an estimated margin;
- means for allocating a number of channels to circuit switched connections for the next set time period such that:
  - if the sum is greater than the pre-determined maximum number then the pre-determined maximum number of channels is allocated to circuit switched connections for the next time period; and
  - if the sum is less than the pre-determined maximum number then a number of channels equal to the sum is allocated to circuit switched connections for the next time period.

The present invention has particular advantage where the transmission link is a point-to multipoint link, for example a broadcast downlink or a multiple access uplink in a fixed wireless access communication system, because the periodic re-allocation of channels does not extend the set up time for circuit switched connections while enabling the efficient use of link resource responsive to the level of loading of the link.

In a preferred embodiment the estimated margin varies with the time of day in order to take into account the variability of loading of the transmission link due to the different patterns of link usage which occur at different times of the day. This means that the estimated margin can be smaller at least at some times of the day than in the embodiments where the estimated margin is constant. This further improves the efficiency of use of link resource according to the present invention.

The controller device will generally allocate the channels not allocated to circuit switched connections to packet switched traffic.

According to a second aspect of the present invention there is provided a controller device for allocating channels on a multi-channel transmission link to circuit switched traffic or packet switched traffic by periodically pre-allocating channels to circuit switched traffic for a set time period dependent on one or more transmission link parameters existing in a previous set time period. The controller device according to the second aspect of the invention has the preferred features of the controller device according to the first aspect of the present invention as set out above.

According to a third aspect of the present invention there is provided a base station in a fixed wireless access communication system comprising a controller device as described above for allocating channels on a multi-channel transmission link of the fixed wireless access communication system to circuit switched traffic or packet switched traffic.

According to a fourth aspect of the present invention there is provided a method of allocating channels on a multi-channel transmission link to circuit switched traffic or packet switched traffic comprising the step of periodically pre-allocating channels to circuit switched traffic for a set time period dependent on one or more transmission link parameters existing in a previous set time period. The method has the preferred features of the control system according to the first aspect of the present invention.

According to a fifth aspect of the present invention there is provided a computer program element comprising computer program code for making a computing device allocate channels on a multi-channel transmission link to circuit switched traffic or packet switched traffic by periodically pre-allocating channels to circuit switched traffic for a set time period dependent on one or more transmission link parameters existing in a previous set time period.

BRIEF DESCRIPTION OF THE DRAWINGS

The present invention will now be described with reference to the accompanying Figures in which:

FIG. 1 shows a communication system comprising a point-to-point communications link (2) between two switches (4) and (6) which link carries digital data from packet switched networks and from circuit switched networks. The link (2) comprises a plurality of channels or circuits (C1 to Cn). The system can be used to establish circuit switched connections between input ports (4a) to (4c) of switch (4) and ports (6a) to (6d) of switch (6) by means of an assignment or cross-connection within the switches (4) and (6). As an example, in FIG. 1 the port (4a) is connected to circuit C1 by switch (4) and circuit C1 is connected to port (6b) by the switch (6) and thereby the port (4a) is connected to port (6b) by the thus formed circuit-switched connection. The circuit switched connection is established on a circuit which has been pre-allocated as discussed below to circuit switched traffic. The circuit switched connection can be established on demand, when a call is set up, by means of control signals exchanged between the switches (4) and (6) and can be released when the call is ended.

Figure 1:
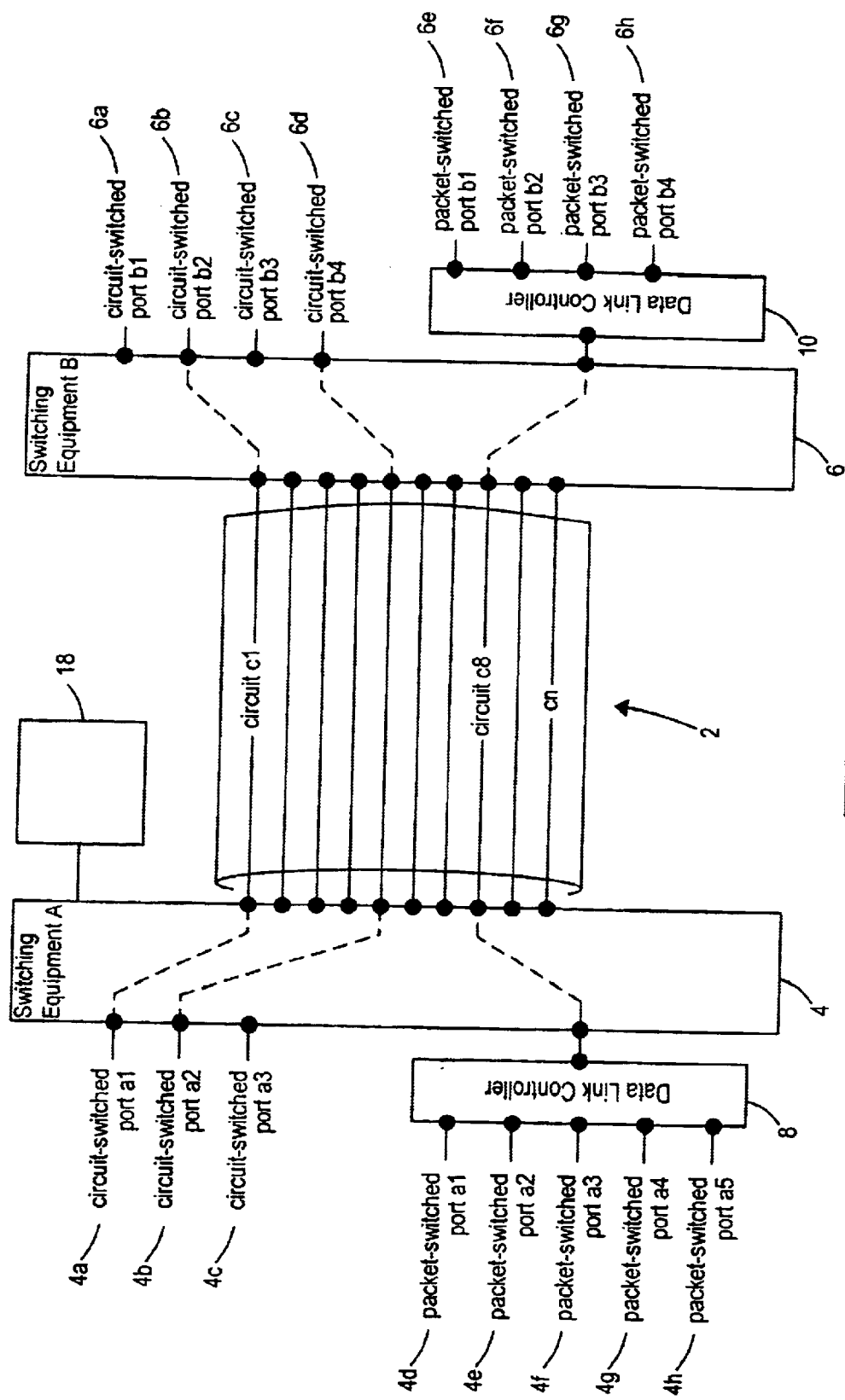
FIG. 1 shows schematically a point-to-point communication system according to the present invention in which channels or circuits are pre-allocated periodically to circuit switched traffic.

Data can also be transmitted across the transmission link (2) by packet switching using a data link controller (8) to encapsulate frames of incoming data, add a header including details of the source and destination port of the system and multiplex packets from several ports, for example ports (4d) to (4h) onto a common circuit (C8) via the switch (4). The circuit (C8) is one of the circuits of the link (2) which is not pre-allocated to circuit switched traffic. This is shown in FIG. 1 where the circuit (C8) interconnects two data link controllers (8) and (10). The packets arriving on circuit (C8) at the switch (6) are switched to the data link controller (10) where the frames are recovered from the packets and routed to the appropriate destination port (6e) to (6h) depending on the information recovered from the packet header. The data link controller (8) requires a queuing scheme to smooth the peaks in the arrival of incoming data to the ports (4d) to (4h).

Figure 2:
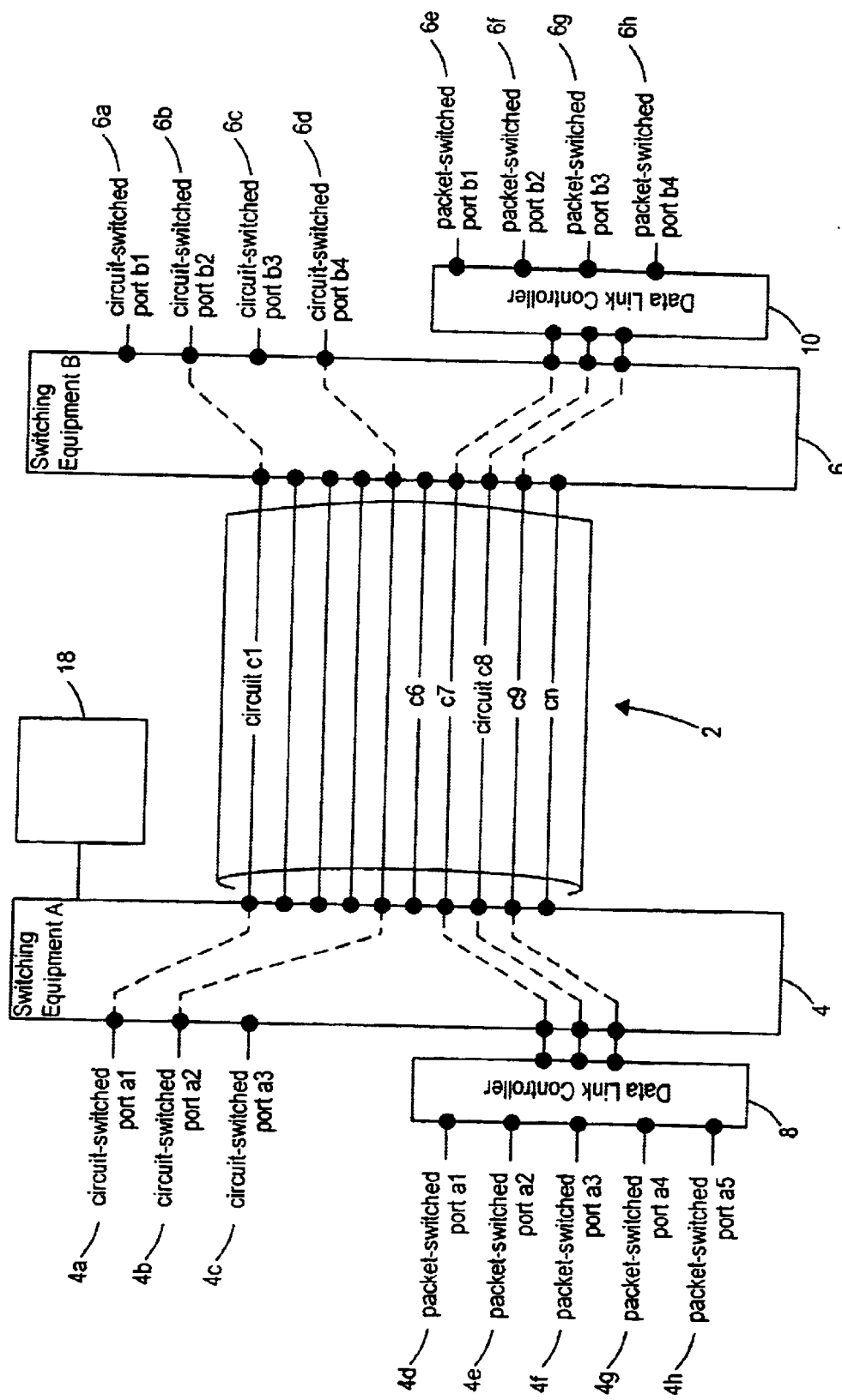
FIG. 2 shows schematically a point-to-point communication system similar to that shown in FIG. 1 except that a virtual circuit comprising circuits (C7) to (C9) for packet switched traffic is formed between the data link controllers (8) and (10)

The data link controller (8) may be capable of transmitting incoming data from ports (4d) to (4h) to ports (6e) to (6h) using multiple circuits, for example circuits (C7) to (C9) as shown in FIG. 2. Again circuits (C7) to (C9) will be circuits which have not been pre-allocated to circuit switched traffic. The data link controller (8) would be arranged to automatically select an appropriate circuit (C7) to (C9) or combination of circuits (C7) to (C9) on a packet by packet basis, perhaps maintaining a separate queue for each circuit (C7) to (C9) and adding packets carrying incoming data to the shortest queue. From a user's perspective, the data link controllers (8) and (10) appear to be interconnected by a single virtual circuit with a capacity equivalent to the total capacity of the constituent individual circuits (C7) to (C9).

The data link controllers (8) and (10) must incorporate a queuing mechanism to absorb instantaneous peaks in the arrival of incoming packet data and that time spent queuing contributes to the latency in the virtual circuit (C7 to 9). The apparent throughput of packet traffic is steadily reduced as the average loading on the virtual circuit (C7 to 9) approaches its peak capacity and the average queue length extends.

While the systems described in relation to FIGS. 1 and 2 have been described as a simplex, ie. with one way transmissions between ports (4a–h) to ports (6a–h), the system could be configured with an additional transmission link also comprising a plurality of circuits so that return transmissions between ports (6a–h) and ports (4a–h), via the switches (6,4) and the link controllers (10,8), would also be possible.

Figure 4:
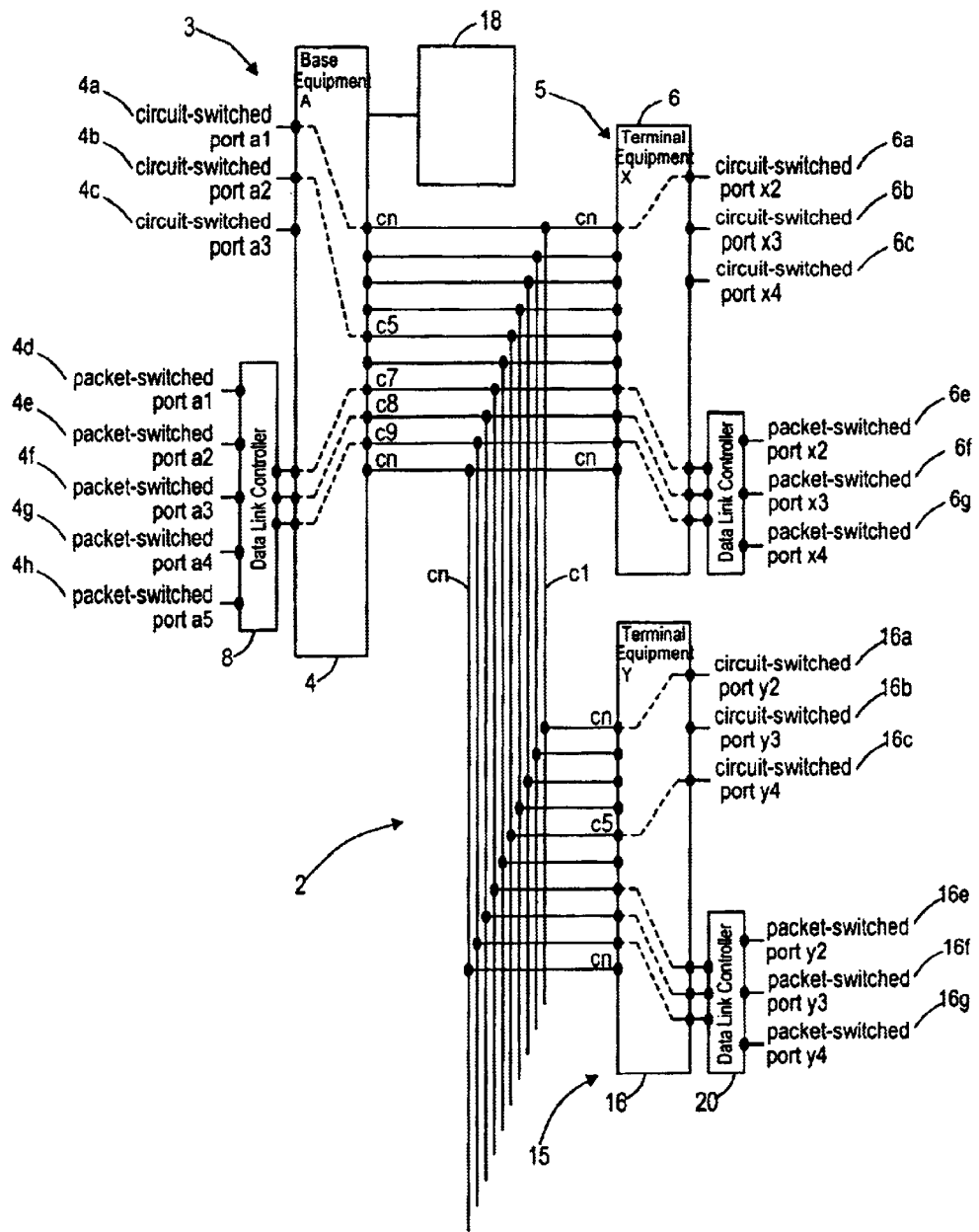
FIG. 4 shows schematically a point-to-multi-point communication system according to the present invention in which channels or circuits are pre-allocated periodically to circuit switched traffic.

Furthermore, while the system described above has been described in relation to a point-to-point transmission link it could also be configured as a point to multipoint transmission link, as shown schematically in FIG. 4 (with like parts labelled by like numerals). FIG. 4 shows schematically a fixed wireless access communication system comprising a broadcast time division multiplexed downlink (2) from a base station (3) comprising a switch (4) to a plurality of end systems, two of which (5, 15) are shown in FIG. 4. The broadcast downlink (2) would be received by a plurality of end systems (5, 15) each comprising an associated switch (6, 16) and a data link controller (10, 20) The link carries digital data from packet switched networks and from circuit switched networks. The individual circuits (C1) to (Cn) are provided by channels in the time division multiplexed downlink which comprises multiple radio frequency carriers.

The system can be used to establish circuit switched connections between input ports (4a) to (4c) of switch (4) and ports (6a, 16a) to (6c, 16c) of the switches (6, 16) of the end systems by means of an assignment or cross-connections within the base station switch (4) and the end system switches (6, 16). As an example, in FIG. 4 the port (4a) is connected to circuit C1 by switch (4) and circuit C1 is connected to port (6a) by the switch (6) in a first end system (5). The port (4b) is connected to circuit (C5) and circuit (C5) is connected to port (16c) by the switch (16) in the second end system. Thereby, two circuit switched connections are made across the downlink (2), a first between port (4a) of switch (4) and port (6a) of switch (6) and a second between port (4b) of switch (4) and port (16c) of switch (16). The circuit switched connections are established on circuits C1 and C5 which have been pre-allocated by the controller (18) to circuit switched traffic, as discussed below. The circuit switched connections can be established on demand, when a call is set up, by means of control signals exchanged between the switches (4), (6) and (16) and can be released when the call is ended.

Data can also be transmitted across the transmission link (2) by packet switching using a data link controller (8) to encapsulate frames of incoming data, adding a header including details of the source and destination port of the system and multiplexing packets from several ports, for example ports (4d) to (4h) onto circuits (C7 to C9) via the switch (4). The circuits (C7 to C9) are circuits of the link (2) which are not pre-allocated to circuit switched traffic. This is shown in FIG. 4 where the circuits (C7 to C9) interconnect a base station data link controller (8) with end system data link controllers (10) and (20). The packets arriving at the switches (6, 16) on the circuits C7 to C9 are switched to the associated data link controllers (10, 20). At the data link controller (10, 20) the frames are recovered from the packets and routed to the appropriate destination port (6e to 6g) or (16e to 16g) of the end system switches (6,16) depending on the information recovered from the packet header. The data link controller (8) requires a queuing scheme to smooth the peaks in the arrival of incoming data to the ports (4d) to (4h).

The time division multiplexed downlink could be complimented by a time division multiple access uplink between the end systems (5, 15) and the base station (3). Again the plurality of circuits (C1) to (Cn) would be provided by channels in the time division multiple access uplink which comprises multiple radio frequency carriers.

The anticipated circuit switched traffic load can be matched to the number of circuits available for circuit switched connections using the controller (18) such that there is an acceptably low probability that a request for a new connection will be denied because all available circuits are already allocated. This probability of blocking is one measure of grade of service for circuit switched information.

The service offered for packet traffic can be considerably improved at times outside the busy period for circuit switched traffic if the pre-allocation of circuits (C1) to (Cn) to circuit switched traffic is done periodically in response to pre-existing levels of incoming circuit switched traffic. For example, if the level of circuit switched traffic allows, additional circuits (eg. C6) can be freed up for use in the virtual circuit (C7 to 9) so that the average queue length for packet traffic is reduced and the apparent throughput for packet traffic thereby improved.

In networks where the busy periods for packet and circuit traffic are offset in time during the day, it is possible to increase the overall capacity of the communication system, by the appropriate periodic allocation of circuits (C1 to Cn) between packet or circuit traffic.

It is impossible to reduce the number of circuits available for circuit switched traffic below the number of established connections without dropping one of the existing circuit switched connections. This is generally considered unacceptable. However, the number of circuits allocated to packet switched traffic can be reduced without dropping connections with the effect of a reduction in throughput for each packet user.

According to the present invention some of the circuits (C1) to (Cn) are pre-allocated to circuit switched traffic using controller (18) by:

a. determining the number of operating circuit switched connections at the end of a previous update time period;

b. forming a sum by adding this number to an estimated margin of unassigned circuits which are reserved for new circuit switched connections estimated for the next update time period;

c. allocating the summed number of circuits to circuit switched connection for the next set time period; and d. repeating steps a to c periodically after each update time period elapses.

Figure 3:
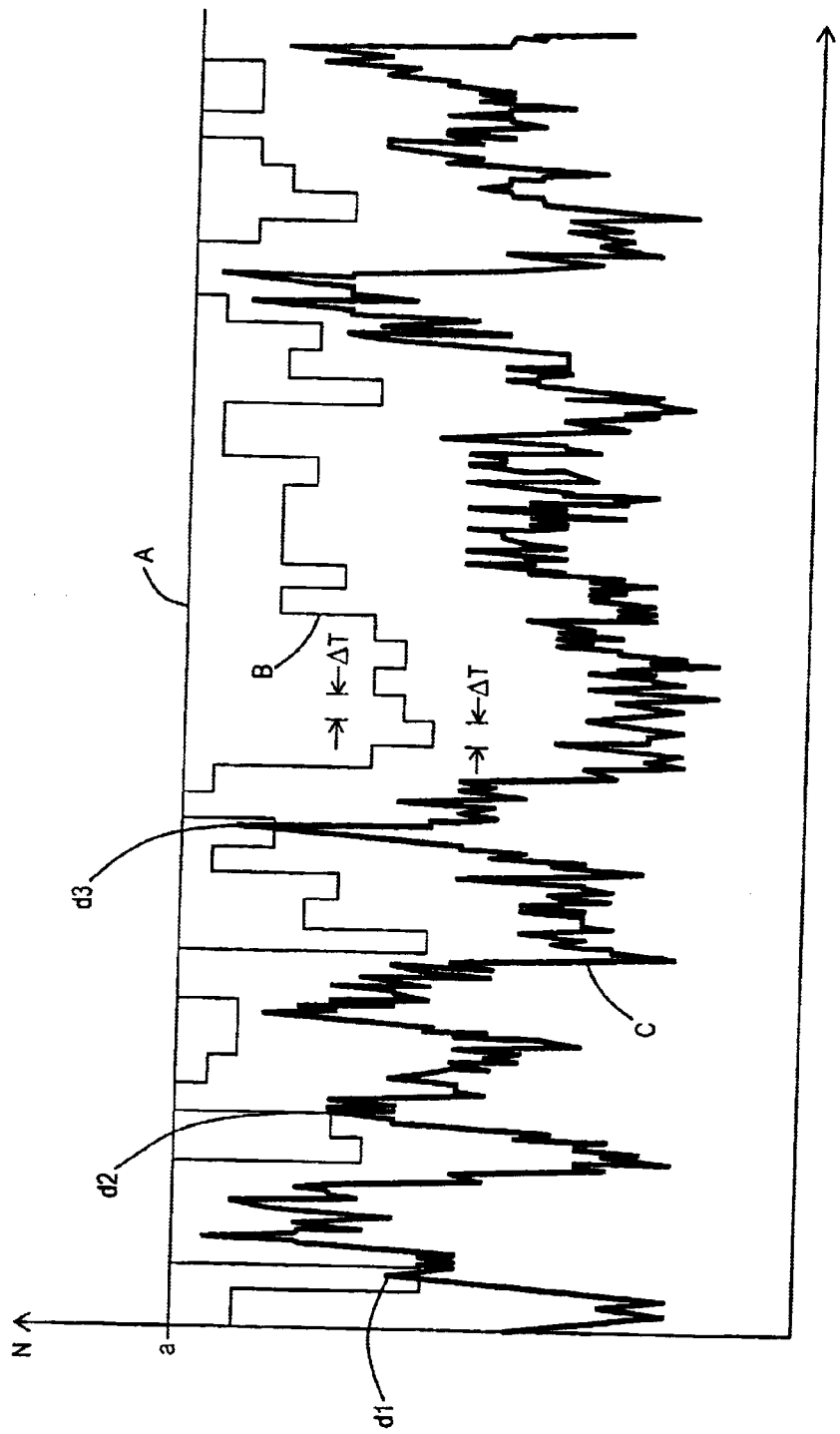
FIG. 3 is a graph showing the maximum number of channels that can be allocated to circuit switched traffic (line A), the time variation in the number of channels in use and blocked (line C) and the variation in the number of channels pre-allocated to circuit switched traffic in accordance with the present invention (line B)

The estimated margin of spare circuits reserved for anticipated new circuit switched connections within the update time period before the next circuit allocation is determined as a function of:

a. the maximum number of circuits available for circuit switched traffic (see line A of FIG. 3). There will be a minimum static allocation of circuits for packet traffic to ensure that there is always at least this minimum resource available on the link for packet traffic;

b. the mean holding time for circuit switched connections, ie. the average length of time between call set up and call release for a circuit switched connection;

c. the target blocking probability for circuit switched traffic; and d. the update period $\Delta T$ between updates to the circuit allocation for circuit switched.

In steady state, the call arrival rate and call-clearing rate are equal. The expected number of calls, $\lambda$, in the update time period $\Delta T$ is given by:

$$\lambda = \mu \Delta T \quad (1)$$

where $\mu$ is the call arrival rate, and $\Delta T$ is the update period.

In this analysis an average call arrival rate which is constant over time is estimated by standard traffic analysis techniques.

Based on a Poisson distribution the probability that X calls will arrive in a period with average call arrival rate $\mu$ is:

$$p(x; \lambda) = \frac{e^{-\lambda}\lambda^x}{x!} \quad (2)$$

The probability that y calls will clear in a period with average call arrival rate $\mu$ is:

$$p(y; \lambda) = \frac{e^{-\lambda}\lambda^y}{y!} \quad (3)$$

The probability that exactly x calls will arrive and exactly y calls will clear is:

$$p(x; \lambda)p(y; \lambda) = \frac{e^{-2\lambda}\lambda^x\lambda^y}{x!y!} \quad (4)$$

If z is the net increase in calls offered during the period, ie. $z = x - y$, and if Z is the margin such that new calls can be connected when $z \leq Z$, then the probability that $z \leq Z$ at the end of the period is given by summing over all possible combinations of x and y:

$$P(Z; \lambda) = \sum \begin{cases} p(x; \lambda)p(y; \lambda) & \forall \ \{x, y : x - y \leq Z, x \geq 0, y \geq 0\} \\ 0 & \forall \ \{x, y : x - y > Z, x \geq 0, y \geq 0\} \end{cases} \quad (5)$$

The probability that a call will be blocked (i.e. not connected) is given by:

$$B = 1 - P(Z; \lambda) \quad (6)$$

The estimated margin of spare circuits reserved for anticipated new circuit-switched connections is selected to be the smallest value for Z such that B is just acceptable. Practical values for B, the target blocking probability, are likely to be between 0.001 and 0.01 (i.e. 0.1% to 1%).

This margin, which is a constant value over time, is then added to the number of operating switched connections at the end of the previous update time period in order to calculate the number of circuits reserved for circuit switched connections in the next update time period.

Figure 5:
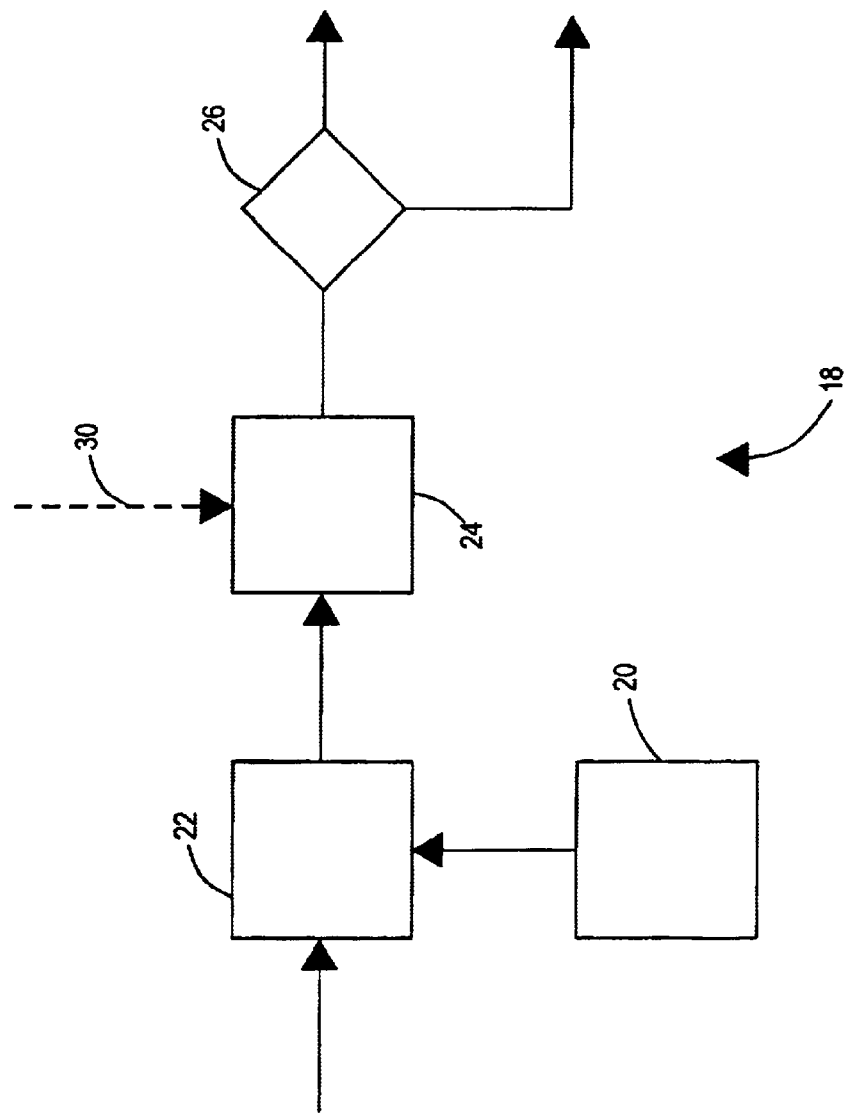
FIG. 5 is a schematic representation of the controller used for allocating circuits to circuit switched and packet switched traffic.

The structure of the controller (18) which periodocally pre-allocates circuits to circuit switched traffic is shown schematically in FIG. 5. When the controller (18) is set up the values of:
  the update time ΔT;
  the maximum number of circuits (a) that can be allocated to circuit switched connections (line A in FIG. 3); and
  the estimated margin (as calculated above);
are set. In each update period ΔT a timer circuit (20) initiates a monitoring unit (22) which monitors data input from the base station switch (6) indicating the number of circuit switched connections in operation at any time and determines the number of circuit switched connections operating at the end of update time period. At the end of the update period ΔT in response to an input from the timer (20) the monitoring unit (22) inputs into a summing unit (24) the number of circuit switched connections operating at the end of the last update period ΔT. The summing unit (24) adds the estimated margin to the said number and outputs the sum. If the sum is above the maximum number of circuits that can be allocated to circuit switched connections (a) then the control unit (26) allocates a number of circuits equal to the maximum number of circuits (a) to circuit switched connections for the next time period ΔT and if the sum is below the maximum number of circuits (a) the control unit (26) allocates a number of circuits equal to the sum output from the summing unit (24) to circuit switched connections for the next time period ΔT. The remaining circuits are allocated to packet switched traffic for the next time period ΔT.

The result of the periodic re-calculation of the number of circuits allocated to circuit switched traffic by the controller (18) of FIG. 5 is shown graphically in FIG. 3. In the graph in FIG. 3 the x-axis (labelled t) represents time and the y-axis (labelled N) represents the number of circuits (C1 to Cn). The maximum number of circuits available for circuit switched traffic is represented by the line A. The lowest line C represents the time variation in the number of circuit switched connections in operation plus blocked connections. The middle curve B is the time variation of the number of circuits allocated to circuit switched traffic by the controller (18). The pre-allocation is repeated by the controller (18) after each time period ΔT has elapsed. The number of circuits allocated to circuit switched traffic at any time (represented by line B) is equal to the number of circuit switched connections in operation at the end of the previous time period ΔT plus the calculated margin of unallocated circuits reserved for new requests for circuit switched connections in the next time period ΔT.

In FIG. 3 there are a small number of instances, at points d1 to d3, where the demand for circuit switched resource exceeds the number of circuits available which would result in some new circuit switched calls being blocked. The incidence of this type of blocking is dependent on the parameters used to calculate the number of circuits allocated to circuit switched traffic. The gap between the curves A and B represent the additional numbers of circuits made available for packet switched traffic by use of the periodic allocation of circuits according to the above methodology as compared to a static allocation scheme.

The calculation of the number of users that can be served by a network of a given size, at a given quality of service, is a standard task in telephone engineering. However, the behaviour of telephone users closely approximates a random process with Poisson characteristics and the number of circuits required is generally less than the calculated capacity. In most practical networks there is a pronounced difference between the average traffic intensity measured at different times of the day, and so the number of circuits required outside the busy period is considerably less than the available capacity. This variable loading can be modelled as a Poisson process with a time-dependent mean.

The probability that exactly x calls will arrive during a time interval according to a Poisson distribution is given by:

$$p(x; \lambda) = \frac{e^{-\lambda} \lambda^x}{x!}$$

where λ is the average number of calls that occur during the time period and e is the base of natural logarithms. Where the call holding time is much less than the update period the time-dependence of the variable loading can be modelled by making λ a function of time-of-day.

Thus, in an alternative embodiment of the present invention which takes account of variations in the loading on the circuits at different times of the day, a time dependent estimated margin can be calculated for each update period ΔT using the calculation according to equations (4), (5) and (6) above but using a time-of-day dependent value for average call arrival λ in each update period ΔT. The re-calculated margin (30) can be input into the summing unit (24) of FIG. 5 at the beginning of each update period ΔT.

What is claimed is:

1. A communication system including:
   a transmission link having a number of channels; and
   means for transmitting circuit switched and packet switched traffic over said transmission link;
   wherein the system additionally includes a controller device for periodically pre-allocating channels to circuit switched traffic for a set time period dependent on one or more system parameters existing in a previous set time period, and
   wherein one of the system parameters is an estimated margin a number of circuit switched connections operating in a previous set time period.

2. A communication system according to claim 1 wherein the controller device comprises:
   a monitoring unit for determining a first number equal to the number of operating circuit switched connections in a previous set time period;
   a summing unit for forming a sum of the first number and the estimated margin;
   means for allocating the summed number of channels to circuit switched connections for the next set time period.

3. A communication system according to claim 1 wherein the controller device comprises:
   a monitoring unit for determining a first number equal to the number of operating circuit switched connections in a previous set time period;
   a summing unit for forming a sum of the first number and the estimated margin;
   means for allocating a number of channels to circuit switched connections for the next set time period such that:
     if the sum is greater than a pre-determined maximum number then the pre-determined maximum number of channels is allocated to circuit switched connections for the next time period; and
     if the sum is less than the pre-determined maximum number then a number of channels equal to the sum is allocated to circuit switched connections for the next time period.

4. A communication system according to claim 1 wherein the transmission link is a point-to multipoint link.

5. A communication system according to claim 1 wherein the transmission link is a broadcast downlink or a multiple access uplink in a fixed wireless access communication system.

6. A communication system according to claim 1 wherein the controller device comprises:
- a monitoring unit for determining a first number equal to the number of operating circuit switched connections in a previous set time period;
- a summing unit for forming a sum of the first number and the estimated margin which margin varies with the time of day;
- means for allocating the summed number of channels to circuit switched connections for the next set time period.

7. A communication system according to claim 1 wherein the controller device allocates channels not allocated to circuit switched connections to packet switched traffic.

8. A controller device for allocating channels on a multi-channel transmission link to circuit switched traffic or packet switched traffic by periodically pre-allocating channels to circuit switched traffic for a set time period dependent on one or more transmission link parameters existing in a previous set time period an estimated margin, wherein one of the link parameters is a number of circuit switched connections operating over the link in a previous set time period.

9. A controller device according to claim 8, comprising:
- a monitoring unit for determining a first number equal to the number of circuit switched connections operating over the link in a previous set time period;
- a summing unit for forming a sum of the first number and the estimated margin;
- means for allocating the summed number of channels to circuit switched connections for the next set time period.

10. A controller device according to claim 8, comprising:
- a monitoring unit for determining a first number equal to the number of circuit switched connections operating over the link in a previous set time period;
- a summing unit for forming a sum of the first number and the estimated margin;
- means for allocating a number of channels to circuit switched connections for the next set time period such that:
  - if the sum is greater than a pre-determined maximum number then the pre-determined maximum number of channels is allocated to circuit switched connections for the next time period; and
  - if the sum is less than the pre-determined maximum number then a number of channels equal to the sum is allocated to circuit switched connections for the next time period.

11. A controller device according to claim 8 wherein the transmission link is a point-to multipoint link.

12. A controller device according to claim 8 wherein the transmission link is a broadcast downlink or a multiple access uplink in a fixed wireless access communication system.

13. A controller device according to claim 8 comprising:
- a monitoring unit for determining a first number equal to the number of circuit switched connections operating over the transmission link in a previous set time period;
- a summing unit for forming a sum of the first number and the estimated margin which margin varies with the time of day;
- means for allocating the summed number of channels to circuit switched connections for the next set time period.

14. A controller device according to claim 8 wherein the controller device allocates channels not allocated to circuit switched connections to packet switched traffic.

15. A base station in a fixed wireless access communication system comprising a controller device according to claim 8 for allocating channels on a multi-channel transmission link of the fixed wireless access communication system to circuit switched traffic or packet switched traffic.

16. A method of allocating channels on a multi-channel transmission link to circuit switched traffic or packet switched traffic comprising the step of periodically pre-allocating channels to circuit switched traffic for a set time period dependent on one or more transmission link parameters existing in a previous set time period and an estimate margin, wherein one of the link parameters is a number of circuit switched connections operating over the link in a previous set time period.

17. A method according to claim 16, comprising the steps of:
- determining a first number equal to the number of circuit switched connections operating over the link in a previous set time period;
- forming a sum of the first number and the estimated margin;
- allocating the summed number of channels to circuit switched connections for the next set time period and repeating the above steps for each successive set time period.

18. A method according to claim 16 wherein, comprising the steps of:
- determining a first number equal to the number of circuit switched connections operating over the link in a previous set time period;
- forming a sum of the first number and the estimated margin;
- allocating a number of channels to circuit switched connections for the next set time period such that:
  - if the sum is greater than a pre-determined maximum number then the pre-determined maximum number of channels is allocated to circuit switched connections for the next time period; and
  - if the sum is less than the pre-determined maximum number then a number of channels equal to the sum is allocated to circuit switched connections for the next time period, and repeating the above steps for each successive set time period.

19. A method according to claim 16 wherein the transmission link is a point-to multipoint link.

20. A method according to claim 16 wherein the transmission link is a broadcast downlink or a multiple access uplink in a fixed wireless access communication system.

21. A method according to claim 16 comprising the steps of:
- determining a first number equal to the number of circuit switched connections operating over the transmission link in a previous set time period;
- forming a sum of the first number and the estimated margin which margin varies with the time of day;
- allocating the summed number of channels to circuit switched connections for the next set time period, and repeating the above steps for each successive set time period.

22. A method according to claim 16 comprising the step of allocating channels not allocated to circuit switched connections to packet switched traffic.

23. A computer program element comprising computer program code for making a computing device allocate channels on a multi-channel transmission link to circuit switched traffic or packet switched traffic by periodically pre-allocating channels to circuit switched traffic for a set time period dependent on one or more transmission link parameters existing in a previous set time period an estimate margin, wherein one of the link parameters is the number of circuit switched connections operating over the link in a previous set time period.

24. A computer program element according to claim 23 for making a computing device execute the steps of:
- determining a first number equal to the number of circuit switched connections operating over the link in a previous set time period;
- forming a sum of the first number and the estimated margin;
- allocating the summed number of channels to circuit switched connections for the next set time period and repeating the above steps for each successive set time period.

* * * * *